March 27, 1934. E. C. HORTON ET AL 1,952,865
ELECTRIC WINDSHIELD HEATER
Filed March 20, 1930 2 Sheets-Sheet 1
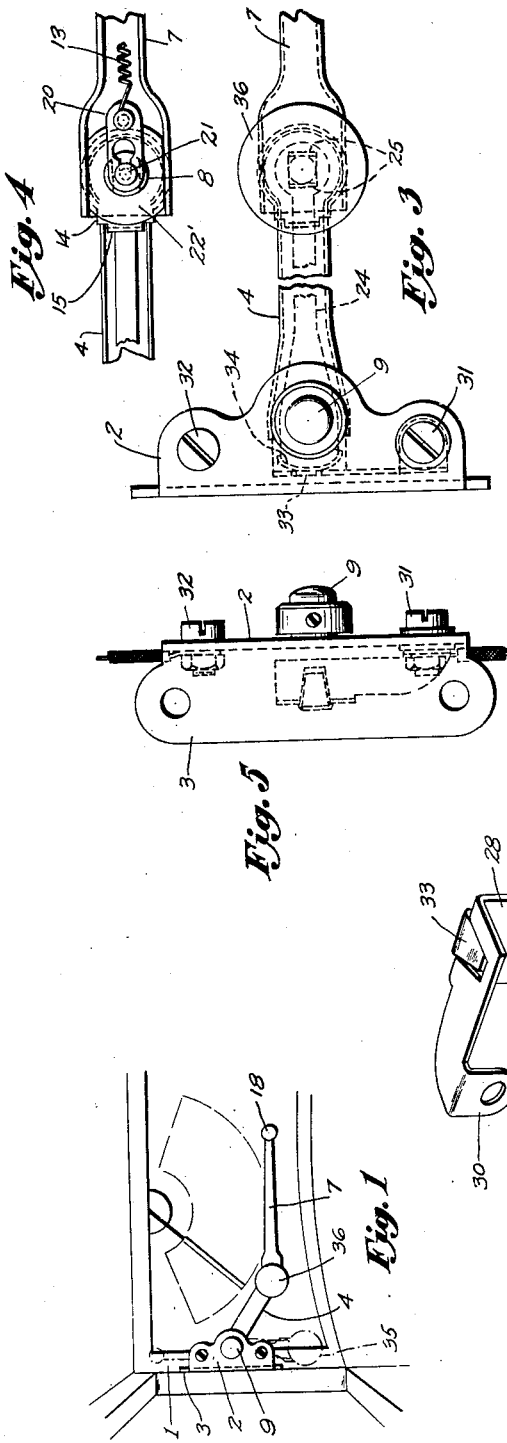
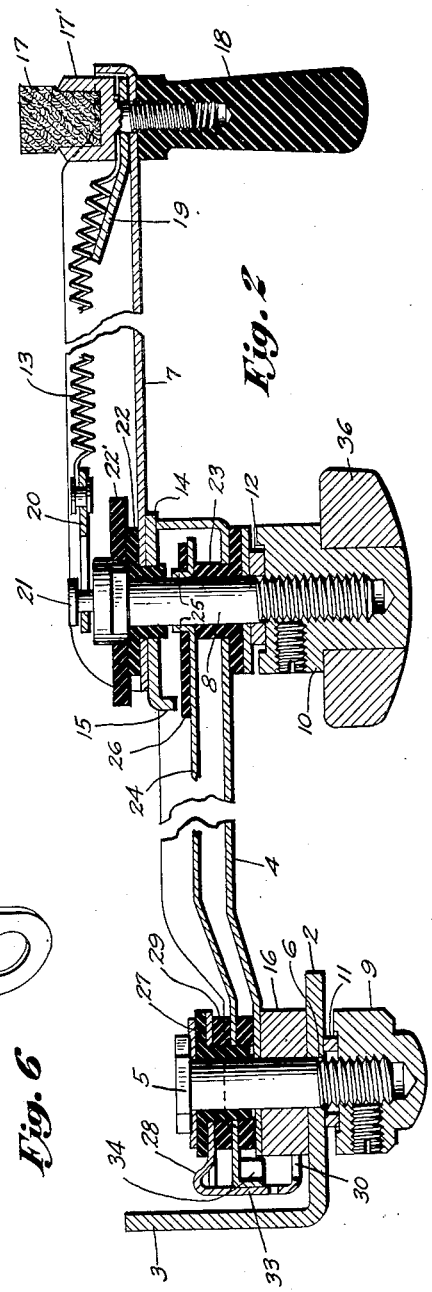
Inventors
Erwin C. Horton
Henry Hueber
by Barton A. Bean Jr.
Attorney March 27, 1934.     E. C. HORTON ET AL     1,952,865
ELECTRIC WINDSHIELD HEATER
Filed March 20, 1930     2 Sheets-Sheet 2
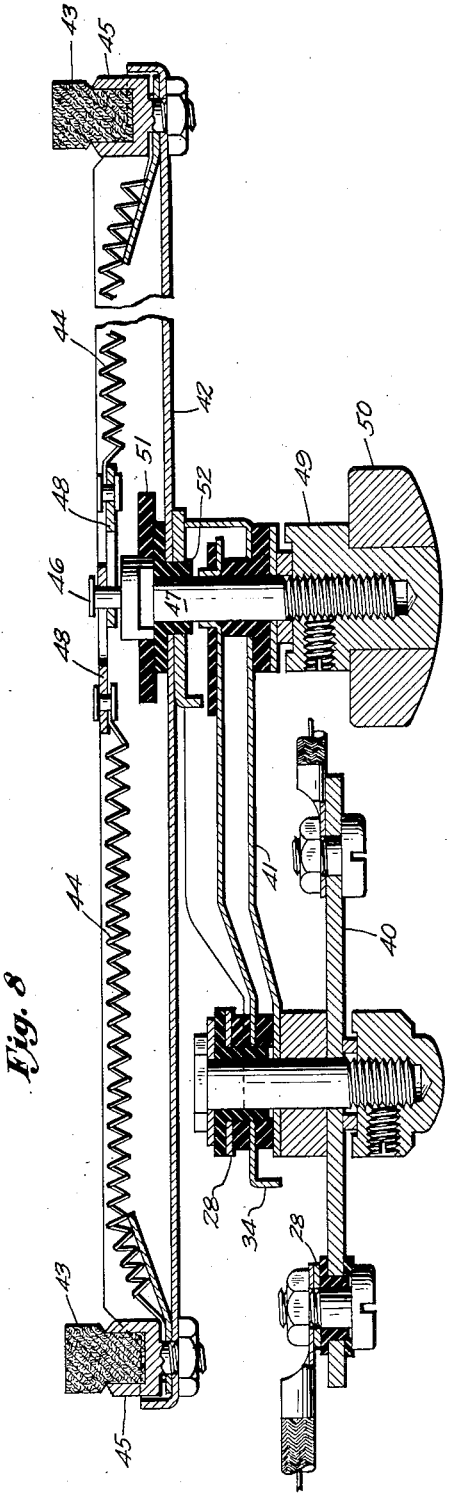
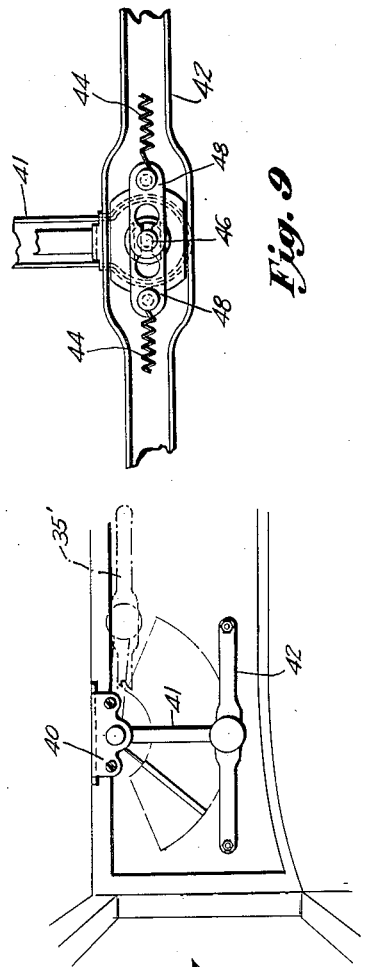
Inventors
Erwin C. Horton
Henry Hueber
by Barton A. Beau Jr.
Attorney Patented Mar. 27, 1934

1,952,865

UNITED STATES PATENT OFFICE 1,952,865

ELECTRIC WINDSHIELD HEATER

Erwin C. Horton, Hamburg, and Henry Hueber, Buffalo, N. Y., assignors to Trico Products Corporation, Buffalo, N. Y.

Application March 20, 1930, Serial No. 437,580

6 Claims. (Cl. 219—19)

This invention relates to certain new and useful improvements in an automobile accessory of the windshield heater type and more particularly to an improved heater of the type disclosed in our copending application, Serial No. 346,088 filed March 11, 1929.

Windshield heaters of prior designs quite largely are arranged and mounted in fixed positions upon the windshield or at least fail to provide that flexibility of adjustment which is so much desired in a windshield heater whereby a selected area of the windshield glass may be heated to enable better vision for the motorist. In the copending application referred to there is provided a windshield heater wherein the heating element is brought into operative relationship with a source of heat by and during movement of the heater from an inoperative to an operative position.

The present invention aims to provide an electric windshield heater wherein the heating element is carried by a flexible support which enables bodily adjustment of the heater to the most advantageous point for applying heat to the windshield.

The invention further resides in providing a foldable support for an electric heater in which distending adjustment of the support will automatically connect the heater element electrically to its source of energy; to provide a collapsible windshield heater in which the several parts are readily folded and unfolded and maintained in a set position against unauthorized movement therefrom; to provide an electric heater for windshields in which the heater section is movably mounted on an adjustable support so that the heater may be properly positioned to suit the demands and requirements of the particular motorist.

Further the invention resides in the structural features by which the electric current is conducted to the resistance element of the heater through the foldable or collapsible support and in a manner to establish electrical connection by and during movement of the heater from its inoperative position.

In the drawings:

Fig. 1 is a view illustrating the improved heater mounted on a windshield of an automobile.

Fig. 2 is a longitudinal sectional view through the distended heater.

Fig. 3 is a fragmentary front elevation illustrating more especially the supporting structure.

Fig. 4 is a rear or inside elevation of the pivoted end of the heater bar and its connection to the adjacent end of the supporting link.

Fig. 5 is an elevation of the heater from the mounting bracket end.

Fig. 6 is a detail perspective view of the switch contact member.

Fig. 7 is a view similar to Fig. 1 but depicting a modified embodiment of the heater arm or bar.

Fig. 8 is a longitudinal sectional view therethrough in distended position, portions being broken away.

Fig. 9 is a view similar to Fig. 4 but depicting the modified construction.

The improved heater may be mounted at any desired point on the windshield, such as the left hand vertical frame member 1, and comprises a mounting bracket 2 having an attaching flange 3. A supporting link or member 4 is mounted on the bracket 2 for movement to and from an operative position. In the present disclosure this movement is pivotal, the member 4 gaining a pivotal support by reason of the bolt 5 which is passed through an aperture 6 in the bracket 2.

To the outer end of the support 4 is mounted the heater bar or arm 7 for adjustment relative to the support 4. This adjustment is also preferably a pivotal one and to this end a pivoting bolt 8 is provided to connect the support and bar together. The two pivots 5 and 8 are provided with tightening nuts 9 and 10 and underlying washers 11 and 12 by which the desired frictional relation may be obtained between the bracket 2, the link 4 and the bar 7 to hold the same either in their distended or collapsed positions, the link 4 and the bar 7 providing a foldable support for the resistance element 13. The two sections 4 and 7 of this foldable or collapsible support may be of channeled formation to provide for lightness and durability, and in order to provide for a broad surface bearing between the bar 7 and the link 4 there is provided a bearing plate 14 bridging the channel of the latter and seating on the flanges thereof for direct supporting contact with the bar 7, the bearing plate 14 being held against rotary displacement by a lug 15 downturned into the channel of the link 4 for interlocking with the marginal flanges thereof. A spacing washer 16 may be arranged on the pivot 5 between the link 4 and the bracket 2.

On the outer end of the heater bar 7 is arranged a buffer or silencing pad 17 for bearing on the windshield glass; this pad being contained within a cup 17' having a threaded stem passing through the outer end of the bar and engaged with a knob 18. One end of the resistance element 13 is clamped beneath the cup 17' as a simple manner of anchoring the element in grounded relation to the bar 7. A spacer 19 is provided to support the resistance element in proximity to the mouth of the bar channel, and the opposite end of the element is supported from the pivot 8 by means of a stirrup 20 designed for interlocking with a headed stud 21 projecting from the pivot 8. Thereby the resistance element is electrically connected to the pivot 8 which latter is insulated from the bar 7 by bushing 22 and from the link 4 by a bushing 23. This bushing serves to space a connector strap or bar 24 from the bottom of the link channel in which it is concealed, the flanges 25 affording said connector a good electrical bearing on the pivot 8. To further insulate the connector there is interposed a layer of insulation 26 between said connector and the bearing plate 14. The opposite end of the connector is supported by the pivot 5, being insulated therefrom by a bushing 27 which also serves to insulate a switch contact 28 that is insulated from the connector by a washer 29.

The switch member is provided with an ear 30 designed for connection to one side of an electric circuit while the mounting bracket 2 is connectible to the opposite side of the circuit, as by means of the respective terminal posts 31 and 32. The switch member is provided with a resilient tongue 33 extending into the path of a contact forming extension 34 of the connector 24. When the heater is folded to its inoperative position, indicated in Fig. 1 by the numeral 35, the contact 34 is spaced from the tongue 33 but upon movement of the link 4 from its folded position said contact 34 will ride onto the spring tongue 33 and establish the electric current through the resistance element 13, the path of the current being from terminal post 31 through parts 28, 33, 34, 24, 8, 21, 20, 13, 7, 14, 4, 5, 2, 32 and back to the source of energy.

In operation, the foldable support is distended either by a grasping of the manipulating handle or knob 13 and swinging the heater bar outwardly, pulling the link therewith, or as an alternative the pivot 8 may be provided with a knob 36 by which a link 4 may be swung outwardly and the pivot 8 turned to extend the heater bar 7, the latter being interlocked with the pivot 8 against relative rotation by means of the flat sided insulating washer 22' engaging respectively flat faces on the pivot and the heater bar.

In the modified showing the mounting bracket 40 is shown as pivotally supporting a link 41 on the outer end of which is pivotally mounted the heater bar 42 which in this embodiment is mounted intermediate its ends and carries at its opposite ends buffer pads 43 for engagement with the windshield glass. Each end of the heater bar 42 houses a resistance element 44 the outer ends of which are grounded beneath the cups 45, containing the pads 43, and the inner ends are interlocked with the headed stud 46 of the pivot 47 by stirrups 48, the pivot 47 serving to pivotally connect the heater bar to the support 41. The proper degree of friction is provided in this pivotal joint by the clamping nut 49 on which may be mounted the manipulating knob 50 so that by turning the knob the multi-armed heater bar may be swung about the outer end of the supporting link 41 to heat a predetermined section of the windshield. The heater bar is connected to the pivot 47 against relative rotation by the insulating washer 51 and is further insulated therefrom by the bushing 52 in a manner similar to that provided in the embodiment disclosed in Fig. 2.

Obviously, when the heater is moved to an inoperative position the heater bar is folded against the adjacent frame member of the windshield, as indicated at 35' in Fig. 7. This inoperative position is also depicted in Fig. 8 wherein the contact 34 fails to close the circuit through plate 28.

By reason of the extensible support for the resistance element the heater bar, comprising a section of said support, may be adjusted about a variable point located within the transparent area of the windshield and therefore the heater bar may be brought to substantially any position on a radius from such point thereby permitting a greater selectivity for the positioning of the heater bar and enabling a more advantageous selection for the point of heat application.

What is claimed is:

1. A windshield heater comprising a mounting bracket, a support pivotally attached thereto, a heater bar pivotally attached to the outer end of the support, said support and heater bar being of channeled formation, a resistance element housed within the channel of the heater bar, a connector bar housed within the channel of the support and electrically connected to the resistance element, said connector bar being insulated from the support and connectible therewith to the opposite sides of an electric circuit, the pivotal attachment of the support and heater including pivot axes substantially normal to the surface of the windshield, whereby said arm may be moved to folded or unfolded position in a plane substantially parallel to the windshield.

2. An electric windshield heater comprising a mounting bracket, a hollow link pivoted at one end thereon, a channeled heater bar pivoted to the outer end of the link and electrically connected therethrough to the bracket, a resistance element grounded to the outer end of the heater bar and housed within the channel thereof, the pivotal connection between the link and bar comprising a pivoting member insulated from the link and bar, means electrically connecting the resistance element to said pivot member, a connector electrically connected to the pivot member and housed within the link, the pivotal connection between the link and bracket comprising a pivot member, said connector comprising a bar pivoting about the axis of said second pivot member and having a contact part movable with the connector, and a switch member insulated from the bracket and adapted to be engaged by said contact part upon movement of the link from a folded position.

3. An electric windshield heater comprising a mounting bracket, a link pivoted thereon, a heater bar movably connected to the outer end of the link and electrically connected therethrough to the bracket, a resistance element grounded to the heater bar and housed within the channel thereof, the connection between the link and bar comprising a member insulated from the link and bar, means electrically connecting the resistance element to said connecting member, a connector electrically connected to the first member and housed within the channel of the link, the pivotal connection between the link and bracket comprising a pivot member, said connector member comprising a bar pivoting about the axis of said pivot member and having a contact part movable thereabout, a switch member carried by said second pivot member having a resilient tongue extending into the path of said contact part for being engaged thereby upon movement of the link relative to the bracket from a folded to an operative position.

4. A windshield heater comprising a mounting bracket, a link pivoted at one end thereto, a heater bar pivoted to the opposite end of the link, friction providing means in the two pivot connections for holding the link and bar in adjusted positions, said bracket, link and bar being electrically connected to each other, a resistance element carried by the bar and connected electrically at one end to the free end of the bar, a connector bar insulatingly housed within the link and electrically connected to the opposite end of the resistance element, and a switch contact insulated from the mounting bracket and connectible to the one side of an electric circuit, the bracket being connectible to the opposite side of the circuit, said connector bar being normally disengaged from the switch contact but movable into electrical connection therewith by and during movement of the link from an inoperative position.

5. In a windshield heater, mounting means fixed adjacent to a windshield, a heater supporting link pivoted to the mounting means for movement thereabout in a plane substantially parallel to the windshield, a heater bar pivoted to the free end of the link for movement independent of the movement of said link about the free end of the link in a plane substantially parallel to the windshield, and an electrical resistance element carried by the heater bar in adjacency to the surface of the windshield.

6. In a windshield heater, mounting means fixed adjacent to one edge of a windshield, a heater supporting member pivotally connected to the mounting means, a heater bar pivotally connected to the free end of the supporting member, the axes of both pivotal connections being normal to the surface of the windshield, and an electrical resistance element carried by the heater bar in adjacency to the surface of the windshield, said pivotal connections permitting of movement of the supporting member and heater arm independently of each other about the respective pivot axes in planes substantially parallel to the windshield, whereby the supporting member and heater arm may be moved to a distended position over the windshield or to a folded position substantially paralleling said edge of the windshield.

ERWIN C. HORTON.
HENRY HUEBER.